US009567069B2

(12) United States Patent
Cox

(10) Patent No.: US 9,567,069 B2
(45) Date of Patent: Feb. 14, 2017

(54) AIRCRAFT DRIVE WHEEL DRIVE SYSTEM WITH TORQUE COUPLING CLUTCH ASSEMBLY

(71) Applicant: Borealis Technical Limited, North Plains, OR (US)

(72) Inventor: Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 14/611,100

(22) Filed: Jan. 30, 2015

(65) Prior Publication Data

US 2015/0217861 A1   Aug. 6, 2015

Related U.S. Application Data

(60) Provisional application No. 61/934,546, filed on Jan. 31, 2014.

(51) Int. Cl.
*B64C 25/40* (2006.01)
*B60B 25/12* (2006.01)
*F16D 41/16* (2006.01)
*B60B 27/00* (2006.01)

(52) U.S. Cl.
CPC ............ *B64C 25/405* (2013.01); *F16D 41/16* (2013.01); *B60B 25/12* (2013.01); *B60B 27/0021* (2013.01); *B60Y 2200/51* (2013.01)

(58) Field of Classification Search
CPC ... B64C 25/405; B64C 25/40; B64D 2205/00; B60B 27/0021; B60B 25/12
See application file for complete search history.

(56) References Cited

U.S. PATENT DOCUMENTS

| 2,430,163 | A | 11/1947 | Dever |
| 3,075,623 | A | 1/1963 | Lund |
| 3,599,767 | A | 8/1971 | Sederquist |
| 3,711,043 | A | 1/1973 | Cameron-Johnson |
| 3,977,631 | A | 8/1976 | Jenny |
| 4,617,838 | A | 10/1986 | Anderson |
| 6,290,044 | B1 | 9/2001 | Burgman et al. |
| 6,657,334 | B1 | 12/2003 | Edelson |

(Continued)

FOREIGN PATENT DOCUMENTS

GB   2457144 A   8/2009

*Primary Examiner* — Tien Dinh
*Assistant Examiner* — Richard R Green

(57) ABSTRACT

An aircraft drive wheel drive system is provided with a torque coupling clutch assembly that transfers torque to a roller traction drive system actuating a non-engine drive means to drive an aircraft landing gear wheel and move the aircraft autonomously in a desired ground direction and at a desired ground speed. The wheel drive system and clutch assembly are mounted completely within the wheel where the clutch assembly is selectively engaged to control torque transmission to the drive system, which selectively transfers actuating torque to the non-engine drive means. A preferred selectable one way clutch is adapted to controllably transfer torque to the wheel drive system and has both failsafe overrunning and selective engagement capability in one or both rotational directions so that torque required to drive the aircraft wheel and move the aircraft at a desired ground speed and direction is transferred only when required by aircraft operating conditions.

12 Claims, 4 Drawing Sheets

(56) References Cited

U.S. PATENT DOCUMENTS

| | | |
|---|---|---|
| 6,838,791 B2 | 1/2005 | Edelson |
| 7,116,019 B2 | 10/2006 | Edelson |
| 7,226,018 B2 | 6/2007 | Sullivan |
| 7,445,178 B2 | 11/2008 | McCoskey et al. |
| 7,469,858 B2 | 12/2008 | Edelson |
| 7,661,329 B2 | 2/2010 | Cali et al. |
| 7,891,609 B2 | 2/2011 | Cox |
| 7,975,960 B2 | 7/2011 | Cox |
| 7,980,371 B2 | 7/2011 | Joki |
| 8,042,670 B2 | 10/2011 | Bartos et al. |
| 8,079,453 B2 | 12/2011 | Kimes |
| 8,109,463 B2 | 2/2012 | Cox |
| 8,617,019 B2 * | 12/2013 | Christensen .......... B64C 25/405 192/103 R |
| 2006/0273686 A1 | 12/2006 | Edelson et al. |
| 2007/0158497 A1 | 7/2007 | Edelson |
| 2010/0252384 A1 | 10/2010 | Eisengruber |
| 2011/0233026 A1 | 9/2011 | Pawley |
| 2013/0277164 A1 | 10/2013 | Prout et al. |

* cited by examiner

AIRCRAFT DRIVE WHEEL DRIVE SYSTEM WITH TORQUE COUPLING CLUTCH ASSEMBLY

PRIORITY CLAIM

This application claims priority from U.S. Provisional Application No. 61/934,546, filed 31 Jan. 2014, the disclosure of which is fully incorporated herein.

TECHNICAL FIELD

The present invention relates generally to drive systems for aircraft drive wheels and specifically to a controllable torque coupling for an aircraft drive wheel drive system designed to effectively and selectively transfer torque while the aircraft is driven by the drive system during taxi and other ground movement.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become a high priority in the management of airport ground operations. The safe and efficient ground movement of a large number of aircraft simultaneously into and out of ramp and gate areas has become increasingly important. As airline fuel costs and safety concerns and regulations have increased, the airline industry is beginning to acknowledge that continuing to use an aircraft's main engines to move aircraft during ground operations is no longer the best option. The delays, costs, and other challenges to timely and efficient aircraft pushback from airport terminals associated with the use of tugs and tow vehicles makes this type of aircraft ground movement an unattractive alternative to the use of an aircraft's main engines to move an aircraft on the ground. Restricted use of an aircraft's engines on low power during arrival at or departure from a gate is an additional, although problematic, option. Not only does such engine use consume fuel, it is also burns fuel inefficiently and produces engine exhaust that contains microparticles and other products of incomplete combustion. Operating aircraft engines, moreover, are noisy, and the associated safety hazards of jet blast and engine ingestion in congested gate and ramp areas are significant concerns that cannot be overlooked.

The use of a drive means, such as a motor structure, integrally mounted with a wheel to rotate the wheel of an aircraft has been proposed. Such a structure should ideally operate to replace use of an aircraft's main engines or an external tow vehicle to move an aircraft independently and efficiently on the ground during taxi. U.S. Pat. No. 2,430,163 to Dever; U.S. Pat. No. 3,977,631 to Jenny; U.S. Pat. No. 7,226,018 to Sullivan; and U.S. Pat. No. 7,445,178 to McCoskey et al, for example, describe various drive means concepts and motors intended to drive aircraft during ground operations. None of the foregoing patents, however, suggests a drive mechanism selectively activated by a clutch to transfer torque and actuate a drive system that actuates a drive means only as required during taxi to move an aircraft independently and efficiently on the ground.

U.S. Pat. No. 7,469,858 to Edelson; U.S. Pat. No. 7,891,609 to Cox; U.S. Pat. No. 7,975,960 to Cox; U.S. Pat. No. 8,109,463 to Cox et al; and British Patent No. 2457144, owned in common with the present invention, describe aircraft drive systems that use electric drive motors to power aircraft wheels and move an aircraft on the ground without reliance on aircraft main engines or external vehicles. While the drive means described in these patents and applications can effectively move an aircraft autonomously during ground operations, it is not suggested that the drive means could be driven or actuated by selective clutch activation of a drive system to selectively transfer torque to actuate an electric motor or any other drive means. None of the foregoing art, moreover, recognizes the significant improvements in drive means operating efficiency possible when gearing systems are replaced by clutch-controlled selective activation of a roller traction or other drive system to transfer torque and actuate drive means that move aircraft autonomously during ground operations.

The drive means currently proposed to drive aircraft on the ground typically rely on gearing systems that operate with the drive means to drive an aircraft wheel and, thus, the aircraft. Traction drives, such as that described in U.S. Pat. No. 4,617,838 to Anderson, available from Nastec, Inc. of Cleveland, Ohio, which relies on ball bearings, can be used to replace gears in some contexts. Adapting roller or traction drive systems to replace gearing and/or gear systems in an aircraft drive wheel to actuate drive means that independently drive an aircraft drive wheel has not been suggested, nor has the use of a selectively activatable clutch assembly to selectively transfer torque to activate such roller traction drive or other drive systems been mentioned.

Many types of vehicle clutch assemblies are well known in the art. U.S. Pat. No. 3,075,623 to Lund; U.S. Pat. No. 3,599,767 to Soderquist; and U.S. Pat. No. 7,661,329 to Cali et al, for example, describe clutch assemblies incorporating sprag or pawl elements that may transmit torque between races or rotatable elements depending, in part, on their relative directions of rotation. One way vehicle clutches designed to lock in one direction and allow free rotation in the opposite direction are also available, as are improved selectable one way clutch designs, such as those described in U.S. Pat. No. 6,290,044 to Burgman et al; U.S. Pat. No. 7,980,371 to Joki; and U.S. Pat. No. 8,042,670 to Bartos et al. Various other selectable clutch designs that provide controllable overrunning and coupling functions in automotive automatic transmissions, are described in U.S. Pat. No. 8,079,453 to Kimes and in U.S. Patent Application Publication Nos. US2010/0252384 to Eisengruber; US2011/0233026 to Pawley; and US2013/0277164 to Prout et al. It is not suggested that any of the foregoing clutch designs may be adapted to activate a roller traction or other drive system to selectively and automatically transfer torque to actuate drive means as required during operation of a drive system to drive an aircraft landing gear wheel to move the aircraft during taxi. Neither the foregoing clutch designs nor other commonly available clutch designs, moreover, are sufficiently robust to function effectively and reliably in an aircraft drive wheel drive system to engage a drive system to transfer torque as required to actuate a drive means and drive an aircraft autonomously during ground operations. Moreover, these systems do not provide the kind of failsafe capability that ensures that the clutch will never be engageable during flight, landing, takeoff, or during any other aircraft operating condition when operation of the drive wheel drive system would be unsafe.

A need exists, therefore, for a clutch assembly with the advantages of a selectable one-way clutch that is specifically designed as an integral component of an aircraft drive wheel drive system to automatically and selectively engage an aircraft drive wheel drive system and selectively transfer torque to actuate a highly efficient drive system-actuated non-engine drive means to drive an aircraft drive wheel and move the aircraft autonomously on the ground that also provides a failsafe capability ensuring that the clutch assembly will never be engageable to activate the drive system when aircraft operating conditions indicate that drive system operation is unsafe.

SUMMARY OF THE INVENTION

It is a primary object of the present invention, therefore, to overcome deficiencies of the prior art and to provide an aircraft drive wheel drive system with a torque coupling clutch assembly with the advantages of a selectable one-way clutch that is specifically designed as an integral component of the aircraft drive wheel drive system to automatically and selectively engage the aircraft drive wheel drive system and selectively transfer torque to actuate a highly efficient drive system-actuated non-engine drive means to drive an aircraft drive wheel and move the aircraft autonomously on the ground that also provides a failsafe capability ensuring that the clutch assembly will never be engageable to activate the drive system when aircraft operating conditions indicate that drive system operation is unsafe.

It is another object of the present invention to provide an aircraft drive wheel drive system with a selectable one way clutch assembly designed to fit completely within the operational profile of the drive wheel drive system when it is mounted within an aircraft landing gear wheel, wherein the clutch assembly is operatively coupled to drive system components to automatically and selectively transfer torque to drive system components as required to drive the drive wheel and move the aircraft autonomously in a desired direction during taxi.

It is an additional object of the present invention to provide a drive system for an aircraft nose or main landing gear wheel with integrated torque-transferring drive system components designed to fit completely within space available in an aircraft wheel that is designed to control drive system operation only when the aircraft is being driven by the drive system on a ground surface.

It is a further object of the present invention to provide an aircraft drive wheel drive system with a clutch assembly that includes a one way selectable clutch integrally coupled to an aircraft drive wheel drive system that automatically transfers torque through drive system components selectively as required to activate drive system components to move an aircraft on the ground and includes a failsafe overrunning capability designed to ensure that the drive system is not engaged when the aircraft is in flight, during landing or takeoff, and at other times when the drive system should not be operational.

It is yet an additional object of the present invention to provide an aircraft drive wheel drive system with a clutch assembly including a selectable one way clutch adapted to be capable of both overrunning and selective engagement in one or both directions of rotation integrally coupled to a roller traction or other drive system to selectively transfer torque required to move an aircraft landing gear drive wheel in a desired direction at a desired speed.

It is yet another object of the present invention to provide an aircraft drive wheel drive system with a clutch assembly integrally coupled with the drive system to selectively transfer torque to components of the drive system, wherein the clutch assembly may be controlled to selectively activate or inactivate a roller traction or other type of drive system so that the drive system is selectively able to actuate or de-actuate a non-engine drive means to transfer torque required to drive the aircraft drive wheel in response to predetermined or selected aircraft operating or environmental conditions.

In accordance with the aforesaid objects, an aircraft drive wheel drive system with a torque coupling clutch assembly is provided that is designed to selectively and controllably transfer torque to an aircraft drive wheel drive assembly. The drive wheel drive assembly includes a non-engine drive means, such as an electric drive motor, actuated by a roller traction or other drive system to drive an aircraft landing gear wheel and move the aircraft autonomously on the ground without reliance on the aircraft's engines or external vehicles. The torque coupling clutch assembly is mounted integrally with drive assembly components completely within space available in an aircraft landing gear wheel where the clutch assembly can be selectively engaged and/or disengaged in response to a control force from an actuator to automatically control torque transmission to the drive system and, therefore, selectively transfer torque to actuate the non-engine drive means. A type of clutch assembly particularly suitable for this purpose is a selectable one way clutch with both a selective engagement capability in one or both rotational directions and a failsafe overrunning capability that is controllably coupled to a roller traction or other drive system to transmit torque and activate the drive system, which then transfers torque required to actuate an aircraft wheel non-engine drive means to drive the aircraft wheel and move the aircraft on the ground in a desired direction at a desired speed. The failsafe overrunning capability ensures that the clutch assembly will not be engaged to activate the drive system so that an aircraft's wheel will not be driven when the aircraft is in flight, during landing and takeoff, and at other times during aircraft operation safety considerations dictate that the aircraft drive wheel drive system should not be engaged.

Other objects and advantages will be apparent from the following description, claims, and drawings.

DESCRIPTION OF THE INVENTION

The benefits of being able to efficiently and safely move an aircraft during ground operations without reliance on the aircraft's main engines or external tow vehicles have long been recognized. Actually achieving these benefits, however, has proved challenging. Applicant's previously proposed aircraft wheel non-engine drive means have been demonstrated to effectively power drive wheels and move aircraft on the ground and, thus, can enable aircraft operators to achieve the advantages of autonomous ground movement. The present invention improves the capabilities of Applicant's original aircraft drive wheel drive system and expands the advantages possible when aircraft can be driven autonomously during ground operations by controllable non-engine drive means independently of the aircraft's main engines and external ground vehicles. These advantages and improvements are achieved, in large part, by the design of an aircraft drive wheel drive system which incorporates a torque coupling clutch assembly-activated drive system to transfer torque and control operation of the non-engine drive means to drive an aircraft landing gear wheel and move the aircraft during taxi.

Figure 1:
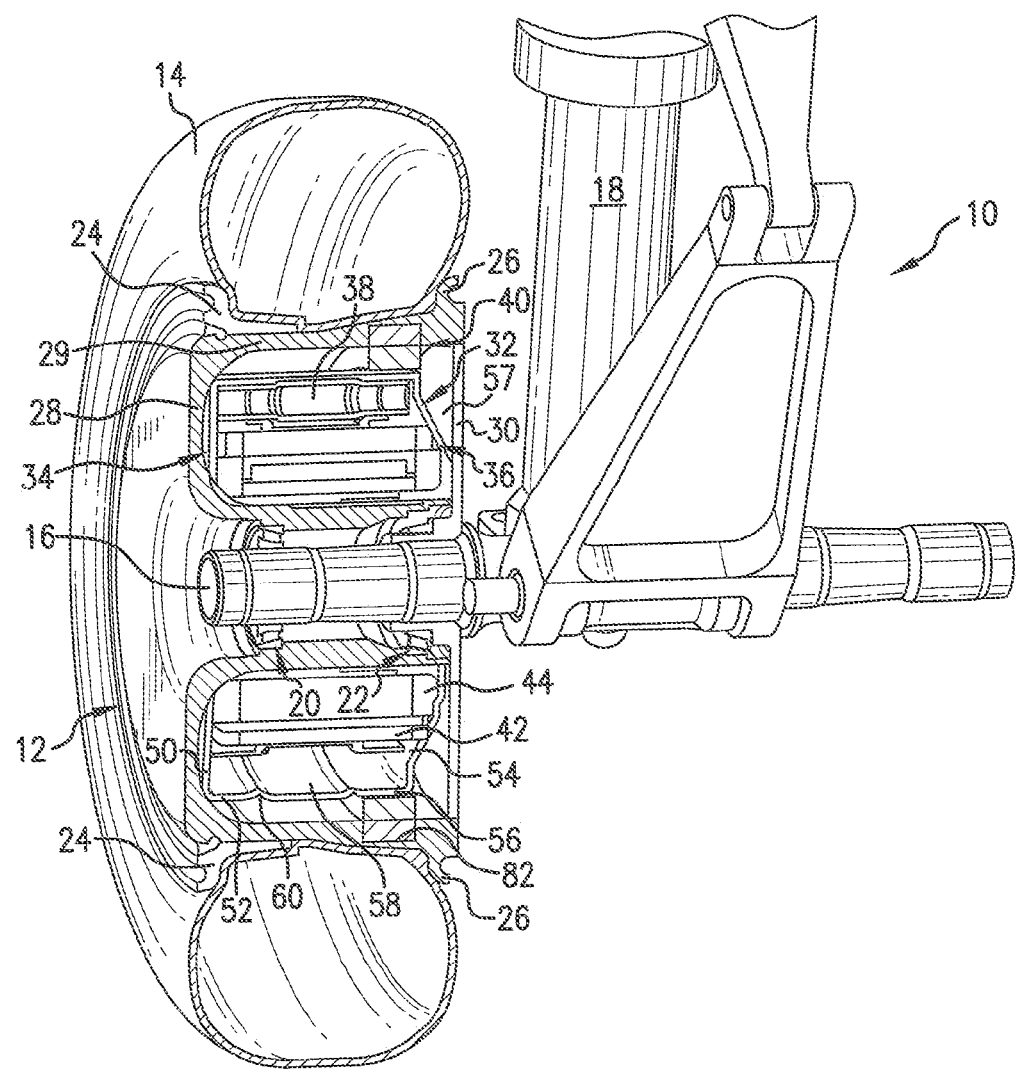
FIG. 1 is a cross-sectional perspective schematic view of a portion of an aircraft landing gear and a landing gear drive wheel with an aircraft drive wheel drive system that includes an integral clutch assembly coupled with a clutch-activated drive system and a non-engine drive means.

Referring to the drawings, which are not drawn to scale, FIG. 1 shows, in cross-sectional perspective view, a portion of an aircraft landing gear 10 and a landing gear wheel 12 with an aircraft drive wheel drive system, including an integral torque coupling clutch assembly mounted within the landing gear wheel. Although only one landing gear wheel is shown in detail, it is contemplated that one or more nose landing gear wheels, one or more main landing gear wheels, or a combination of nose and main landing gear wheels could be equipped with integral torque coupling clutch assemblies in drive wheel drive systems as described herein. In one possible arrangement, for example, equipping both wheels in a two-wheel nose landing gear with an aircraft drive wheel drive system with a torque coupling clutch assembly, as described herein, provides the capability not only to effectively move the aircraft on the ground, but also to differentially steer and brake the aircraft using the torque coupling clutch assembly to selectively transfer torque and activate a non-engine drive means in each wheel.

A tire 14 is shown mounted on the wheel 12. The wheel 12 and tire 14 are rotatably mounted on an axle 16 attached to the landing gear 10. The landing gear 10, which is retractable, includes a central piston 18 and other standard landing gear structures (not identified) typically found in an aircraft nose or main wheel landing gear. The wheel 12 is rotatably supported on the axle 16 by support structures, such as, for example, the bearing arrangements 20 and 22 shown adjacent to the axle 16. Other suitable support structures or bearings may also be used for this purpose. The wheel 12 preferably has the two part configuration shown in FIG. 1, although other wheel designs may also be effectively employed and are contemplated to be within the scope of the present invention.

Figure 2:
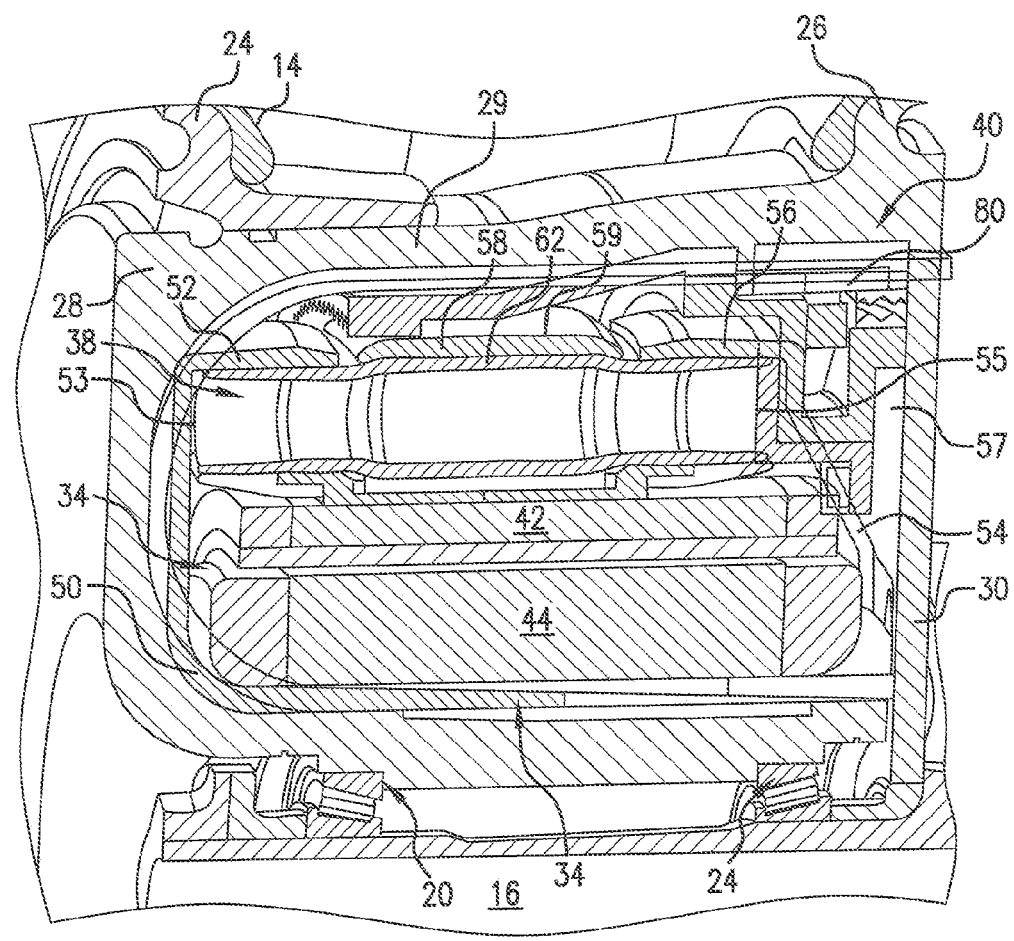
FIG. 2 is a diagrammatic view of a portion of the aircraft landing gear drive wheel of FIG. 1, showing the relative locations of the components of the present drive wheel drive system, including a torque coupling clutch assembly, a preferred roller traction drive system, and a non-engine drive means mounted completely within a space in the wheel defined to hold these system components.

In the aircraft wheel design shown in FIGS. 1 and 2, removal and remounting of the tire 12 is facilitated by providing a demountable tire flange 24, preferably on an outboard side of the wheel 12, so that it can be removed when necessary. A stationary tire flange 26 is provided to hold an opposite side of the tire 14. The stationary tire flange is preferably integrally formed with an upper portion 29 of a substantially "C"-shaped outboard wheel wall section 28 that may form most of the wheel. A smaller inboard wheel wall section 30 may connect to the outboard wheel section 28 to define a maximum space or volume within the dimensions of the wheel 12 where components of a drive wheel drive system can be mounted. To provide a clearer view of the main components of a preferred aircraft drive wheel system, elements, such as, for example, a tire valve stem, are not shown.

A preferred configuration and arrangement of components of a preferred drive wheel drive system 32, including a torque coupling clutch assembly, is shown in FIGS. 1 and 2. Other functionally equivalent arrangements and configurations of drive wheel drive system components are also contemplated to be within the scope of the present invention. In the configuration shown, the components of the drive system 32 are enclosed within a system housing 34 that may be shaped to fit completely within the space and volume created by the arrangement of the respective outboard and inboard wall sections 28 and 30 of the wheel 12. The main elements of the drive wheel drive system include a non-engine drive means 36, a drive system 38, and a torque coupling clutch assembly 40, preferably positioned as shown in FIGS. 1 and 2, although other suitable positions and locations may also be used. In the arrangement shown, the components of the non-engine drive means 36 and the drive system 38 are not centered within the wheel space, but are positioned within the system housing 34 so that the outboard edges of these structures are in parallel alignment with the outboard wheel wall 28. As a result, the system housing 34 has the asymmetrical configuration shown. Other arrangements that produce other system housing configurations may also be used and are contemplated to be within the scope of the present invention.

A preferred non-engine drive means 36 may be an electric motor assembly that includes a rotating element, such as a rotor 42, and a stationary element, such as a stator 44. The rotor 42 is preferably located externally of the stator 44, as shown, but other drive means component arrangements could also be used and are contemplated to be within the scope of the present invention. For example, the positions of the rotor 42 and stator 44 could be reversed so that the rotor is internal to the stator.

A non-engine drive means 36 preferred for use with the aircraft drive wheel drive system of the present invention may be an electric motor assembly that is capable of operating at high speed to generate sufficient torque to move aircraft of a range of different sizes and may be any one of a number of suitable designs. An example of one type of electric motor assembly that could be used effectively in the present system is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range that can drive an aircraft wheel to move an aircraft on the ground and function as described herein may also be suitable drive motors in the present drive wheel system. A high phase order electric motor of the kind described in, for example, U.S. Pat. Nos. 6,657,334; 6,838,791; and 7,116,019, the disclosures of the aforementioned patents being incorporated herein by reference, may be effectively used as a non-engine drive means 36. Other non-engine drive means, including other electric, hydraulic and/or pneumatic drive motors, that may be configured to fit within the landing gear wheel space shown and described herein are also contemplated to be useful with the torque coupling-activated drive system of the present aircraft drive wheel drive system.

The system housing 34 is specifically designed to operatively enclose the drive means 36 and the drive system 38, as well as to operatively support the torque coupling clutch assembly 40 as it is controlled to transfer torque as required to activate and deactivate the drive system 38. FIG. 2 shows the clutch assembly 40 and other structures of the drive system 36 in greater detail than they appear in FIG. 1. The system housing 34 is designed to enclose and/or support the aircraft drive wheel drive system components completely within the space available in an aircraft drive wheel. One possible system housing 34, shown in FIGS. 1 and 2, may be formed in sections and includes an outboard section 50 that extends from the stationary element 44 of the drive means substantially parallel to the wheel wall 28 toward the wheel section 29 to form an outboard lip 52 that contacts and wraps around an outboard end 53 of the drive system 38. An inboard section 54 of the motor housing 34 is angled from the stationary element 44 toward the horizontal upper wheel section 29 to form an inboard lip 56 that contacts and wraps around an inboard end 55 of the drive system 38. The inboard lip 56 is interposed between an outer surface of the drive system inboard end 55 and the clutch assembly 40. A circumferential central system housing section 58 is disposed between the housing outboard lip 52 and inboard lip 56 and contacts an output surface 59 of the drive system. This three-part arrangement of the system housing can also be seen clearly in the lower part of FIG. 1.

The drive system 38, which may be positioned between the drive means 36 and the system housing sections 52, 56, and 58, is not shown in the lower part of the wheel 12 in FIG. 1, providing a clearer view of the system housing sections. It will be noted that circumferential gaps 60 may be provided between the central circumferential section 58 and the outboard and inboard lip portions 52 and 56 of the system housing to permit thermal expansion of housing sections during operation.

As discussed above, the inboard section 54 of the system housing may be angled to correspond to the asymmetric shape of the nonparallel inboard edges of the drive means elements 42 and 44 and the drive system 38, which provides an inboard recess 57 between the system housing wall 54 and the inboard wheel wall 30. The recess 57 may provide space to accommodate components of the clutch assembly 40, and a clutch recess 80 may be provided in the wheel section 29 to accommodate clutch components, if needed. The inboard system housing section 54 and recess 57 could also direct and receive wiring (not shown) from drive means elements, sensors, and/or other components that must be attached to wiring. This wiring may be a wire harness or other convenient wiring arrangement that ultimately connects the drive wheel components to the aircraft electrical system and/or another source of electrical power.

The drive system 38 is a system that performs essentially the same functions that would be performed by gearing or a gear system. The replacement of gearing by a drive system, particularly by a roller traction drive system, in an aircraft drive wheel drive system presents many advantages. A roller traction drive system that is designed to actuate a non-engine drive means capable of moving a commercial sized aircraft on the ground not only may have a low profile and be light weight, but it may also provide the high torque and high speed change ratio required to optimally operate the drive means to move an aircraft on the ground. Unlike a gear system, a roller traction drive system has substantially zero backlash and can be made of dry running components that do not require lubrication. Planetary and other gear systems are capable of only limited gear ratios, while an infinite gear ratio is possible with a preferred roller traction drive system. A preferred roller traction drive system is, in addition, self-energizing. Other advantages of integrating a roller traction drive system with an aircraft drive wheel non-engine drive means to drive an aircraft wheel and move an aircraft on the ground can also be realized.

One type of roller traction drive system 38 particularly preferred for use in the aircraft drive wheel system of the present invention employs a series of rollers, preferably arranged in two rows and positioned within opposed motive surfaces or "races," so that a respective inner or outer row of rollers contacts an inner or outer race. The rollers, which are preferably hollow cylinders, contact the motive surfaces with pure rolling contact and low friction and, therefore, are highly efficient. Rollers have been found to function more efficiently than balls in a drive structure, although drive systems that employ balls are also contemplated to be within the scope of the present invention. Rollers, particularly hollow cylindrical rollers, do not demonstrate the high levels of friction and/or wear that characterize gears typically used to drive a motor or other drive means. In addition, traction and rigidity of a roller traction drive system may be varied as the number of rollers in a roller traction drive is varied, with increased numbers of rollers increasing traction and rigidity. A range of different configurations of roller traction drive systems and other drive systems that satisfy the parameters described above could be activated by a torque coupling clutch assembly and used to actuate a drive means in an aircraft drive wheel to move the aircraft effectively and efficiently during ground operations.

The torque coupling clutch assembly 40 of the present invention is preferably activated automatically, but may be activated manually, to selectively transfer torque to the drive system 38 to activate and deactivate the drive system into and out of torque transferring actuation with the non-engine drive means 36 so that the drive means is actuated to move an aircraft wheel to drive an aircraft on the ground or, when appropriate, de-actuated so that the drive means is unable to drive the aircraft wheel. The drive system should only be engaged by the clutch assembly to actuate the drive means when the aircraft is actually on the ground, such as after landing and prior to takeoff, and when the aircraft is traveling at a desired speed during ground travel. Engagement and disengagement of the clutch assembly 40 could be targeted to the speed of the aircraft wheel 12 and/or to speeds of drive wheel system components, including the speed of the drive system 38, as well as to predetermined environmental or other conditions. It is preferred that the aircraft drive wheel drive system include one or more failsafe mechanisms, such as, for example, an overrunning or failsafe overrunning capability in the torque coupling clutch assembly 40, to prevent the clutch assembly from transferring torque to engage or actuate the drive system 38 when the aircraft landing gear wheels are not supporting the aircraft on the ground, such as, for example, when the aircraft is in flight and at other times when an aircraft landing gear wheel should not be driven. The selectable one way clutch described below may be adapted for use in an aircraft drive wheel drive system to be selectively engaged in both rotational directions and has a failsafe overrunning capability.

The torque coupling clutch assembly 40 may be located in an inboard portion of an aircraft wheel, such as within the recess 57 adjacent to the system housing inboard lip section 56 as shown schematically in FIG. 1 and in more detail in FIG. 2. However, other locations within an aircraft wheel may also be more appropriate in some drive system configurations and are also contemplated to be within the scope of the present invention. A circumferential clutch assembly recess 80 may be provided in the wheel section 29 and may be configured to receive correspondingly configured circumferential clutch components, such as those discussed below. This arrangement may also enable the clutch diameter to be press fit into the recess 80 if needed to ensure disengagement of the clutch assembly.

Although a range of different types of clutches capable of automatically and selectively transferring torque is described in the art, they have been designed to drive automotive automatic transmissions, which present different design and operating conditions than those presented in an aircraft drive wheel drive system intended to move a commercial sized aircraft on a ground surface. One type of clutch that may be adapted for use in the aircraft drive wheel drive system described herein is a clutch with both one-way and selectable features. A one-way type of clutch is designed to prevent interruption of drive torque between input and output clutch elements. Torque is transmitted when the rotation of one element with respect to another is in one direction, with the clutch overrunning or freewheeling when the rotational direction is reversed. A basic one-way clutch operates in either a locked mode in one rotational direction and a freewheel or overrunning mode in the opposite rotational direction, and the operating mode may be determined by the direction of torque applied to the input element. A selectable one-way clutch may include, in addition to input and output elements, a selector ring configured, typically with windows or pockets, to engage a number of circumferentially spaced rockers, struts, or similar movable locking elements. The locking elements may be configured to selectively hold torque in a selected forward and/or reverse rotational direction to establish different clutch operating modes. Selectable or controllable one way clutches are capable of producing a driving connection between an input element and an output element in one or both rotational directions and may also be able to freewheel or overrun in one or both rotational directions, if needed. This type of clutch may also produce a mechanical connection between rotating or stationary shafts or like elements in one or both rotational directions. Some selectable one-way clutches may also include a second set of locking elements in combination with a slide plate to control torque transfer through the clutch in both forward and reverse directions. A controllable one-way clutch may include an externally controlled selection or actuation mechanism that may be moved between two or more positions that correspond to different operating modes.

Figure 3:
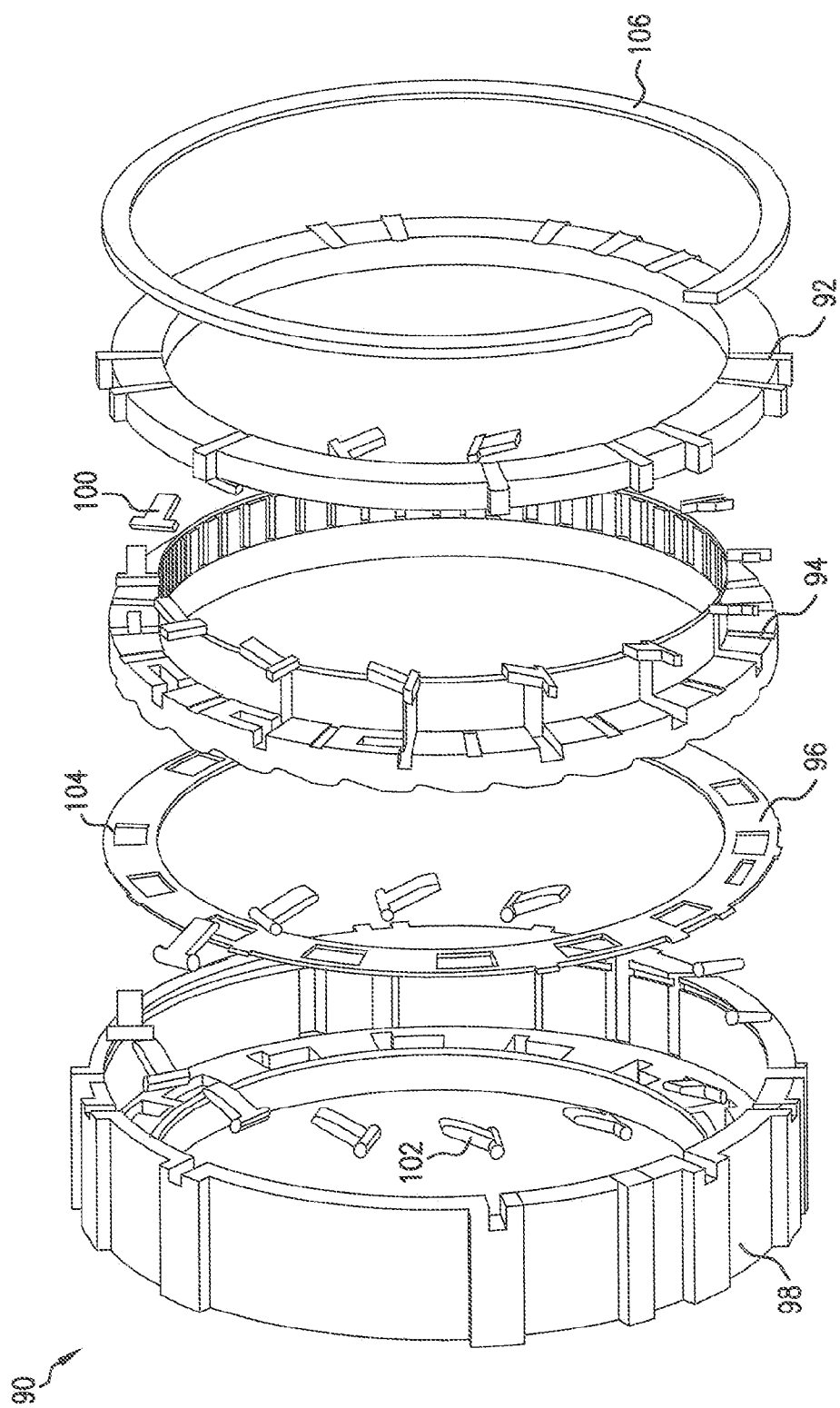
FIG. 3 is a schematic representation of one type of torque coupling selectable one-way clutch assembly useful in an aircraft landing gear drive wheel drive system according to the present invention.

One type of clutch assembly that may be adapted for use with the aircraft drive wheel drive system described herein is a clutch assembly that incorporates features of both a one-way clutch and a selectable or controlled one-way clutch in a single clutch assembly that may be engaged selectively in one or both directions and has a failsafe overrunning capability to ensure that the clutch may not engage the drive system to drive the aircraft wheel during flight, landing, takeoff, or during other situations when operation of the drive system would not be safe. FIG. 3 illustrates one possible arrangement of clutch assembly elements that may be adapted to provide the benefits of both a selectable or controllable and a one-way clutch in an aircraft landing gear wheel environment. The clutch assembly 90 shown in FIG. 3 incorporates features of both a one-way clutch and a controlled or selectable clutch. The one-way clutch elements may include an input element or selector plate 92, a forward/reverse plate 94, an actuator ring 96, and a reverse pocket plate 98. A first set of a plurality of locking elements 100 is shown spaced circumferentially with respect to the forward/reverse plate 94. A second set of a plurality of locking elements 102, shown spaced circumferentially with respect to the reverse pocket plate 98, is designated reverse locking elements. The locking elements 100, 102, sometimes referred to in the art as struts or rockers, may have different configurations that enable them to pivot into and out of engagement with corresponding receptacles or pockets (not shown) that may be formed in a structure such as the forward/reverse plate 94 and the pocket plate 98. The locking elements may be spring biased or otherwise held in a desired position to prevent or allow torque transmission in a selected rotational direction. Generally a snap ring 106 or equivalent structure is provided to hold the components of the clutch assembly 90 in an axial orientation that facilitates engagement and disengagement of the clutch assembly components to control torque transfer as required. It is preferred that these components be arranged to enable all possible combinations of engagement and disengagement of forward and reverse locking elements 100 and 102 to selectively control torque transfer when an aircraft drive wheel drive system is required to move the aircraft in a forward direction or in a reverse direction, or to prevent torque transfer when the aircraft is stopped. The arrangement of clutch assembly components is preferably also adapted to provide a failsafe overrunning capability that prevents engagement and activation of the drive system when such engagement or activation would be unsafe, including when an aircraft is in flight and during landing and takeoff, as well as at any other time when operation of the aircraft drive wheel drive system could adversely affect safe operation of the aircraft.

Figure 4:
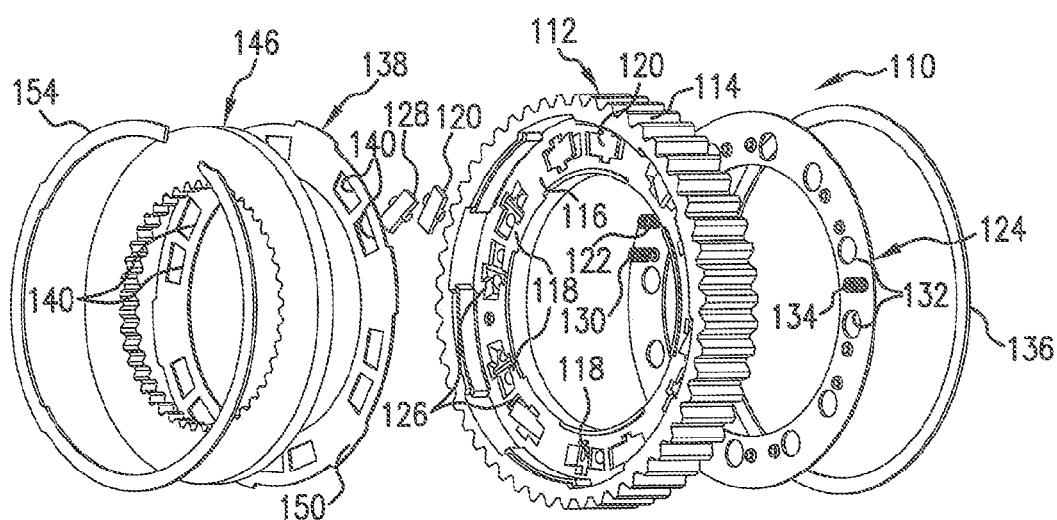
FIG. 4 is an exploded perspective view of components of a second type of torque coupling selectable one-way clutch useful in an aircraft landing gear drive wheel drive system according to the present invention.

FIG. 4 illustrates another possible arrangement of components in a controllable clutch assembly 110 that may be adapted for use in the aircraft drive wheel drive system described herein. An annular pocket plate 112 with an axially-extending splined surface 114 has an inner surface 116 with reverse pockets 118 formed to receive and retain reverse locking elements or struts 120. An end section of each strut 120 may be biased by a corresponding spring 122 or an equivalent biasing element when a biasing plate 124 supporting these elements is moved toward an opposed end section of a strut. The inner surface 116 of the pocket plate 112 may also include forward pockets 126 shaped to receive forward locking elements or struts 128 that are biased by biasing elements or springs 130 supported on the plate 124 when the plate 124 is moved toward an opposed end of a forward strut 128. The biasing plate 124 may additionally be provided with a plurality of openings 132 designed to register with corresponding structures 133 (FIG. 5B) on a facing surface of the pocket plate 112. Biasing springs, such as spring 134, may be provided on the biasing plate 124 to bias the plate 124 and the pocket plate 112 toward or away from each other, as desired, in the presence or absence of a control force. A ring 136 may be provided to hold the biasing plate 124 within the pocket plate 112.

An annular plate 138 may include spaced windows 140 to allow the reverse struts 120 and the forward struts 128 to pivot in their respective pockets 118 and 126. This allows the struts 120, 128 to engage corresponding locking recesses or notches 142 in a facing surface 144 (FIG. 5B) of the notch plate 146. When the biasing plate 124 is caused to move toward the plate 112 along a common rotational axis 148 (FIGS. 5A and 5B) by a control force, the reverse struts 120 and/or forward struts 128 will engage the locking recesses or notches 142 in the notch plate 146. The notch plate 146 is designed to rotate relative to and within the annular pocket plate 112 about the common rotational axis 148. The annular plate 138 does not rotate and may include circumferential projections 150 that may be received in correspondingly configured recesses 152 in the annular plate 138. A snap-type ring 154 may be provided to retain the notch plate 146 in the pocket plate 112. The ring 154 may be designed to hold the notch plate 146, the annular plate 138, and the pocket plate 112 together so that axial movement of these plates is limited. The forward struts 128 may lock the notch plate 146 to the pocket plate 112 in one direction of relative rotational movement about the axis 148, but may allow freewheeling or overrunning in the opposite direction of rotation about the axis 148. The reverse struts 120 may also lock the notch plate 146 to the pocket plate 112 in the opposite or reverse direction of rotation about the axis 148.

Figures 5A, 5B:
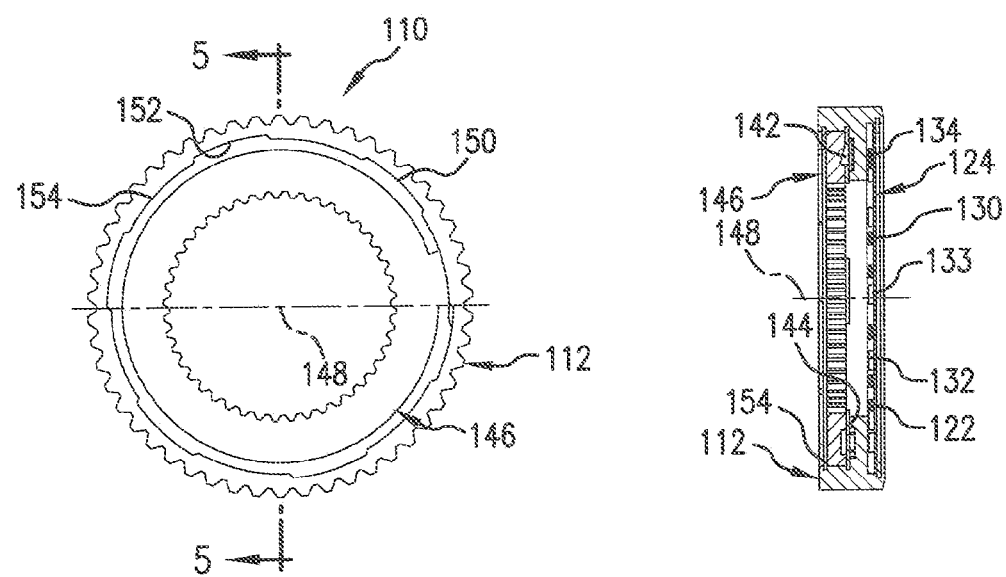
FIG. 5A illustrates a face view of the torque coupling clutch assembly shown in FIG. 4.
FIG. 5B is a cross-section of the torque coupling clutch assembly of FIG. 4 taken along line 5-5 of FIG. 4.

FIGS. 5A and 5B illustrate additional views of the clutch assembly of FIG. 4. FIG. 5A shows a facing view of the clutch assembly 110, with the snap ring 154 at the left in FIG. 4 and the retaining ring 136 at the right. In FIG. 5A, the snap ring 154 appears on the outward face of the assembly.

The foregoing clutch assemblies are merely illustrative of clutch assemblies proposed for automotive applications that may be adapted to be used effectively in an aircraft landing gear wheel environment, specifically in an aircraft landing gear drive wheel drive system, such as that described herein, to transfer an optimum drive torque to activate a roller drive system to actuate an electric drive motor to drive an aircraft wheel at a desired torque to move the aircraft on a ground surface at a desired speed. It is contemplated that any clutch assembly that is sufficiently robust, that is selectively controllable, both to prevent an interruption of drive torque and to interrupt drive torque to a drive system such as that described above when conditions warrant, and that may be adapted to function in an aircraft landing gear wheel environment may be useful in the present drive wheel drive system.

It is further contemplated that a selectable clutch assembly as described above may be actuated by a hydraulic actuator, an electromagnetic actuator, or any other actuating system available for this purpose that may be automatically or manually controlled to produce a control force to engage or disengage, as appropriate, an aircraft drive wheel drive system to transmit drive torque to the system as required to drive the aircraft in a forward or reverse direction during movement on a ground surface.

It is preferred that the various plates, struts, biasing springs, and other components of the clutch assembly described above be designed to withstand high torque loads, preferably torque loads in excess of a determined maximum torque load for the present aircraft drive wheel drive system and made of materials capable of effective long term operation in environmental conditions likely to be encountered by aircraft landing gear wheels.

While the present invention has been described with respect to preferred embodiments, this is not intended to be limiting, and other equivalent arrangements and structures that perform the required functions are contemplated to be within the scope of the present invention.

INDUSTRIAL APPLICABILITY

An aircraft drive wheel drive system with a selectable one way clutch assembly designed to function as a torque coupling to selectively activate or deactivate a roller traction or other drive system in an aircraft drive wheel to transfer drive torque to actuate a non-engine drive means to drive an aircraft wheel and move an aircraft autonomously on the ground will find its primary applicability where it is desired to realize the benefits of controlling movement of an aircraft very efficiently on the ground without reliance on the aircraft's main engines or external ground vehicles.

The invention claimed is:

1. An aircraft drive wheel drive system designed to selectively transfer torque and drive an aircraft landing gear wheel to efficiently move an aircraft autonomously without reliance on aircraft engines or external vehicles during ground operations comprising:
   a. a wheel drive system assembly mounted completely within a space defined interior to a tire-supporting wall and between inboard and outboard walls of one or more aircraft nose landing gear wheels and operably connected to said one or more nose wheels to control forward and reverse rotation of said one or more nose wheels; and
   b. said wheel drive system assembly comprising an electric drive motor in driving and rotation powering contact with said one or more nose wheels to drive said one or more nose wheels at a desired speed and torque;
      a drive system in actuating and powering contact with said electric drive motor to actuate said electric drive motor to power said one or more nose wheels at said desired speed and torque; and
      an automatically or manually controllable clutch assembly supported completely and integrally within said defined space within said one or more nose wheels and coupled in selective engagement and disengagement torque transfer and actuating relationship to said drive system; wherein said clutch assembly comprises a selectable one-way clutch configured to selectively transfer or prevent transfer of torque comprises a through said wheel drive system assembly wherein said drive system comprises a roller traction drive system, and said selectable one-way clutch comprises a hydraulic or electromagnetic actuator in actuating communication with said selectable one-way clutch automatically or manually controllable to transfer an optimum drive torque to said roller traction drive system in response to a control force from said actuator.

2. An aircraft drive wheel drive system designed to drive an aircraft landing gear wheel and efficiently move an aircraft autonomously during ground operations comprising:
   a. one or more wheels rotatably mounted on an aircraft nose or main landing gear controllable to drive the aircraft autonomously during ground travel without reliance on aircraft engines or external vehicles; and
   b. a wheel drive system assembly mounted completely within said one or more wheels operably connected to said one or more wheels to control rotation of said one or more wheels, wherein said wheel drive system assembly comprises a drive motor in driving and rotation powering contact with said at least one wheel to drive said at least one wheel at a desired speed and torque; a drive system in actuating contact with said drive motor to activate said drive motor to power and drive said wheel at said desired speed and torque; and a clutch assembly coupled to transfer torque to said drive system and automatically or manually controllable to selectively engage and disengage said drive system into and out of said activating torque transfer contact with said drive motor;

wherein said clutch assembly is supported integrally with said drive motor and said drive system completely within said one or more wheels and comprises a selectable one-way clutch coupled in selective drive torque transfer control relationship to said wheel drive system assembly, wherein said selectable one-way clutch comprises a plurality of coaxial rotating annular plates positioned to support and selectively engage a plurality of reverse and forward locking elements supported by at least one of said plates in response to a control force from a controllable actuator in automatic or manual actuating communication with said selectable one-way clutch.

3. The system of claim 2, wherein said plurality of reverse and forward locking elements comprise spring biased structures adapted to be movable into and out of engagement with corresponding recesses in one or more of said annular plates to selectively overrun or lock rotational movement of said one or more annular plates in a reverse or in a forward direction in response to said control force.

4. The system of claim 2, wherein said reverse and forward locking elements comprise rockers, struts, or pins.

5. The system of claim 2, wherein said selectable one-way clutch rotating annular plates and said locking elements are designed to withstand torque loads in excess of a determined maximum torque load for said aircraft drive wheel drive system and are made of materials designed for long term operation aircraft landing gear wheel environmental and operating conditions.

6. The system of claim 2, wherein said drive motor comprises a high phase order electric motor, said drive system comprises a roller traction drive system in actuating contact with said high phase order electric motor, and said selectable one-way clutch is automatically or manually controllably coupled in torque transfer relationship with said roller traction drive system and comprises a plurality of coaxial rotating annular plates supporting and selectively engaging a plurality of reverse and forward locking elements supported on at least one of said plates in response to a control force produced by a hydraulic or electromagnetic actuator, whereby an optimum drive torque is automatically or manually selectively transferred or not transferred from said selectable one-way clutch to said roller traction drive system.

7. The system of claim 6, wherein said selectable one-way clutch is automatically or manually controllable to prevent engagement of said reverse and forward locking elements in response to said control force so that said clutch is configured to be in an overrunning condition and unable to activate said roller traction drive system.

8. The system of claim 2, wherein said selectable one-way clutch comprises a failsafe mechanism operable to prevent transfer of torque to said drive system.

9. A method for selectively transferring torque required to drive an aircraft landing gear wheel to drive an aircraft autonomously without engines or external vehicles during ground operations only when the aircraft landing gear wheels may be safely driven, comprising:

a. mounting a wheel drive system assembly mounted completely within the walls of one or more of an aircraft's nose or main landing gear wheels to control rotation of the landing gear wheels in a forward or a reverse direction to drive the aircraft;

b. providing within each wheel drive system assembly an electric drive motor in torque transfer and powering contact with the landing gear wheels, a drive system in activating and torque transfer contact with the electric drive motor to activate said electric drive motor to power said wheel, and an automatically or manually actuatable and selectively engageable and disengageable clutch assembly comprising a selectable one-way clutch comprising a plurality of coaxial rotating plates supporting and selectively engaging, in response to a control force from a controllable actuator, a plurality of reverse and forward locking elements supported on at least one of the plates coupled in transfer torque actuating contact with the drive system; and c. automatically or manually actuating the selectable one-way clutch to selectively engage or disengage the drive system into or out of torque transfer contact with the electric drive motor to control rotation of the landing gear wheels in a desired forward or reverse direction or to prevent rotation of the landing gear wheels, as required to transfer an optimum torque only when the aircraft may be driven safely during ground operations.

10. The method of claim 9, further comprising providing within each wheel drive assembly a drive system comprising a roller traction drive system in activating torque transfer contact with the electric drive motor; and automatically or manually controlling torque transfer from the drive system to the electric drive motor and activating the electric drive motor to move the landing gear wheels in the desired forward or reverse direction at a desired speed and torque when the aircraft is moving on a ground surface, and automatically or manually preventing torque transfer to the landing gear wheels through each wheel drive assembly when the aircraft is taking off, landing, or in the air, or when the wheel drive system assembly may not be operated safely to drive the aircraft safely during ground operations.

11. The method of claim 9, further comprising providing the selectable one-way clutch with an automatically or manually actuatable integral failsafe overrunning capability and preventing engagement and activation of the drive system into torque transfer contact with the electric drive and controlling or preventing rotation of the landing gear wheels when the failsafe overrunning capability is actuated to prevent engagement of the selectable one-way clutch and torque transfer to the drive system and the electric drive motor when the aircraft is taking off, landing, or in the air, or when wheel drive system assembly may not be operated safely or the aircraft may not be safely driven on the ground.

12. The method of claim 9, further comprising arranging the plurality of reverse and forward locking elements in a plurality of engagement and disengagement combinations to selectively control torque transfer when the wheel drive assembly is powered to move the aircraft in the desired forward and reverse directions at a desired speed and to prevent torque transfer when the aircraft is stopped.

* * * * *